United States Patent
Marchal et al.

(10) Patent No.: US 10,519,576 B2
(45) Date of Patent: Dec. 31, 2019

(54) FIBER STRUCTURE WOVEN AS A SINGLE PIECE BY 3D WEAVING, AND AN APPLICATION THEREOF TO FABRICATING A COMPOSITE MATERIAL PART

(71) Applicant: SAFRAN AIRCRAFT ENGINES, Paris (FR)

(72) Inventors: Yann Marchal, Portsmouth, NH (US); Dominique Coupe, Medford, MA (US); Monica Fruscello, Amesbury, MA (US); Jonathan Goering, York, ME (US)

(73) Assignee: SAFRAN AIRCRAFT ENGINES, Paris (FR)

( * ) Notice: Subject to any disclaimer, the term of this patent is extended or adjusted under 35 U.S.C. 154(b) by 259 days.

(21) Appl. No.: 15/605,417

(22) Filed: May 25, 2017

(65) Prior Publication Data
US 2017/0260661 A1    Sep. 14, 2017

Related U.S. Application Data

(62) Division of application No. 14/365,369, filed as application No. PCT/FR2012/052853 on Dec. 10, 2012, now Pat. No. 10,280,537.

(60) Provisional application No. 61/570,432, filed on Dec. 14, 2011.

(51) Int. Cl.
*D03D 25/00* (2006.01)
*B29B 11/16* (2006.01)
(Continued)

(52) U.S. Cl.
CPC ............ *D03D 25/005* (2013.01); *B29B 11/16* (2013.01); *B29C 70/24* (2013.01); *D03D 1/00* (2013.01);
(Continued)

(58) Field of Classification Search
CPC ........ D03D 25/005; D03D 13/00; D03D 1/00; F01D 5/147; B29C 70/24;
(Continued)

(56) References Cited

U.S. PATENT DOCUMENTS 4,922,968 A * 5/1990 Bottger ................. B29C 70/222
139/384 R
7,101,154 B2   9/2006 Dambrine
(Continued)

OTHER PUBLICATIONS

International Search Report issued in PCT/FR2012/052853 dated Nov. 20, 2013.

*Primary Examiner* — Laura C Powers
*Assistant Examiner* — Larissa E Rowe
(74) *Attorney, Agent, or Firm* — Oblon, McClelland, Maier & Neustadt, L.L.P.

(57) ABSTRACT

In a fiber structure woven as a single piece by three-dimensional weaving, first warp yarns interlink layers of weft yarns in a first portion of the fiber structure adjacent to a non-interlinked zone and also weft yarns of a second portion of the fiber structure beyond the non-interlinked zone, and second warp yarns interlink layers of weft yarns of the second portion of the fiber structure adjacent to the non-interlinked zone and also layers of weft yarns of the first portion of the fiber structure beyond the non-interlinked zone, such that the paths of the first and second warp yarns cross in at least one transition zone extending within the fiber structure from the end of the non-interlinked zone, the transition zone extending in the warp direction over a distance greater than the pitch between adjacent warp columns.

8 Claims, 10 Drawing Sheets

(51) Int. Cl.
*D03D 1/00* (2006.01)
*D03D 13/00* (2006.01)
*F01D 5/14* (2006.01)
*B29C 70/24* (2006.01)

(52) U.S. Cl.
CPC ............. *D03D 13/00* (2013.01); *F01D 5/147* (2013.01); *D10B 2505/00* (2013.01); *F05D 2220/36* (2013.01); *F05D 2300/6012* (2013.01); *F05D 2300/6034* (2013.01); *Y10T 156/1051* (2015.01); *Y10T 442/3203* (2015.04)

(58) Field of Classification Search
CPC ......... Y10T 442/3203; Y10T 156/1051; F05D 2220/36; F05D 2300/6012; F05D 2300/6034
USPC ....... 139/408–415; 428/542.8; 442/204–207, 442/542.8
See application file for complete search history.

(56) References Cited

U.S. PATENT DOCUMENTS

| | | | |
|---|---|---|---|
| 2003/0056847 A1* | 3/2003 | Schmidt | B29C 70/24 139/383 R |
| 2010/0105269 A1 | 4/2010 | Goering et al. | |
| 2010/0144227 A1* | 6/2010 | Coupe | B29C 70/24 442/207 |
| 2011/0277869 A1 | 11/2011 | Coupe | |

* cited by examiner

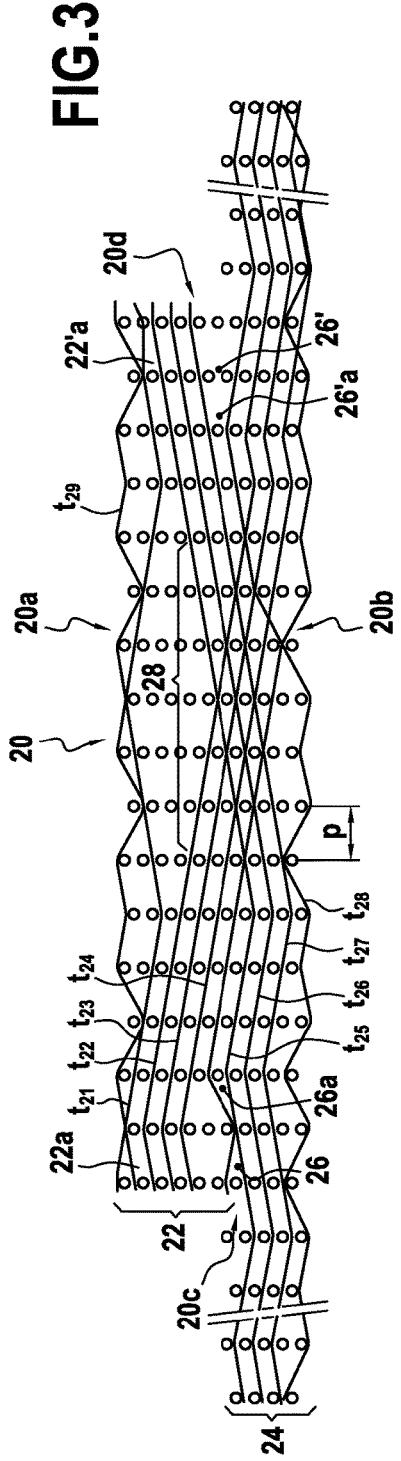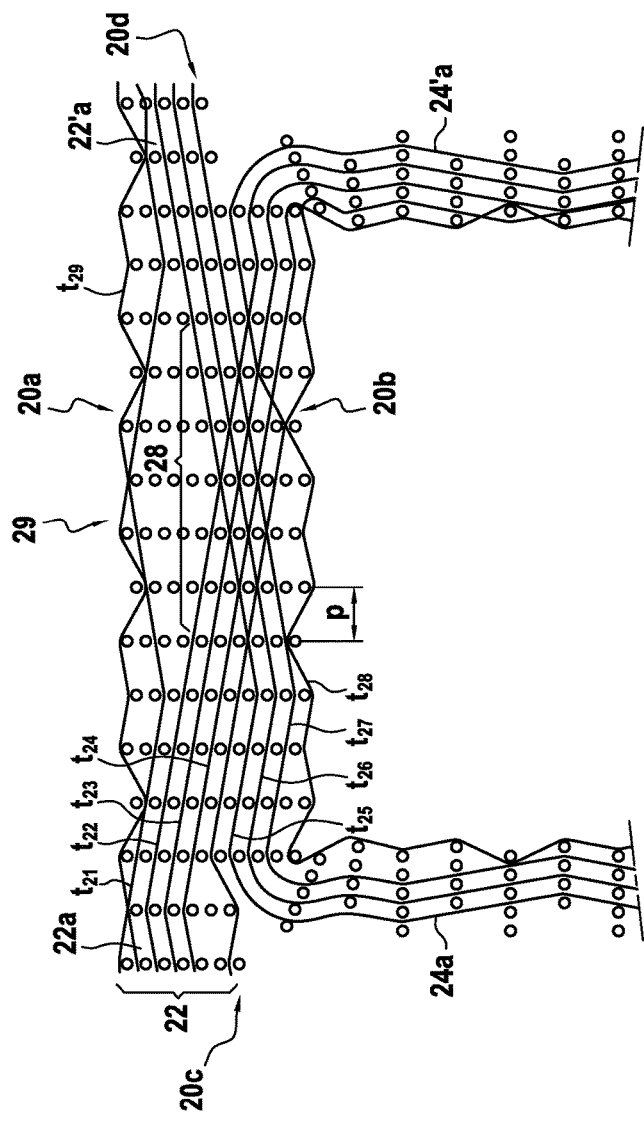

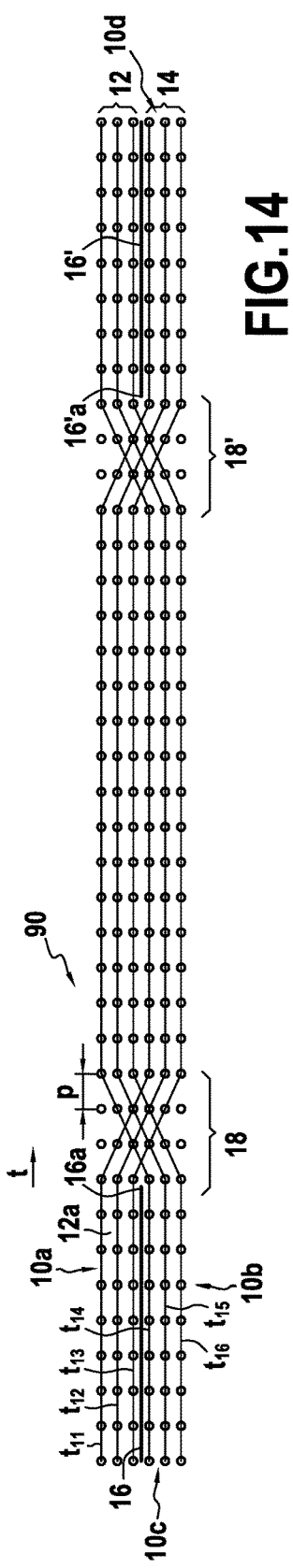
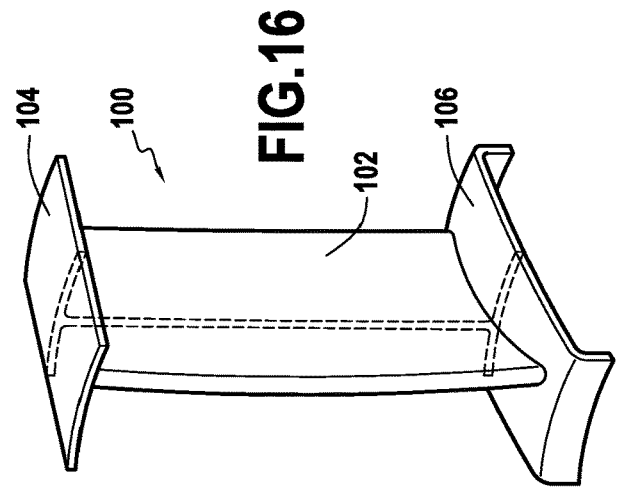
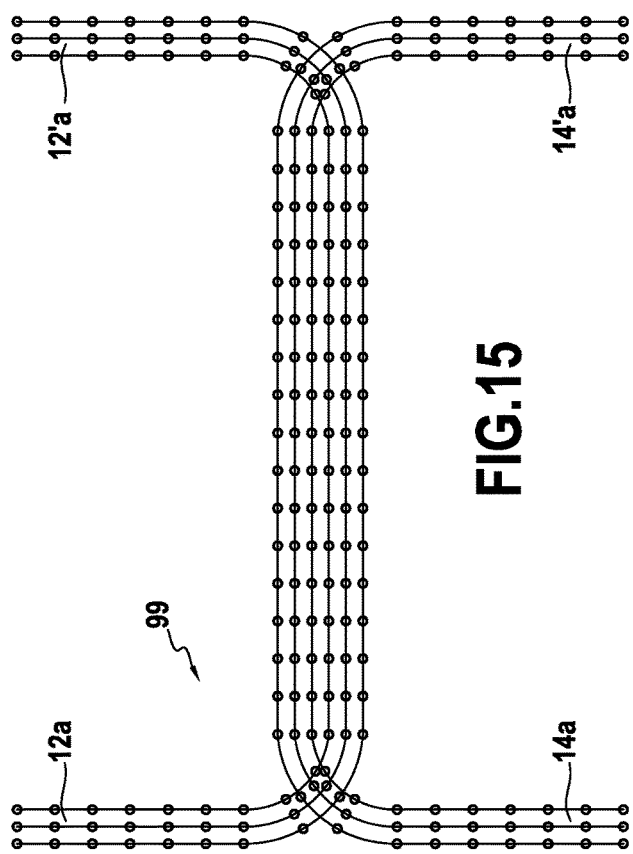

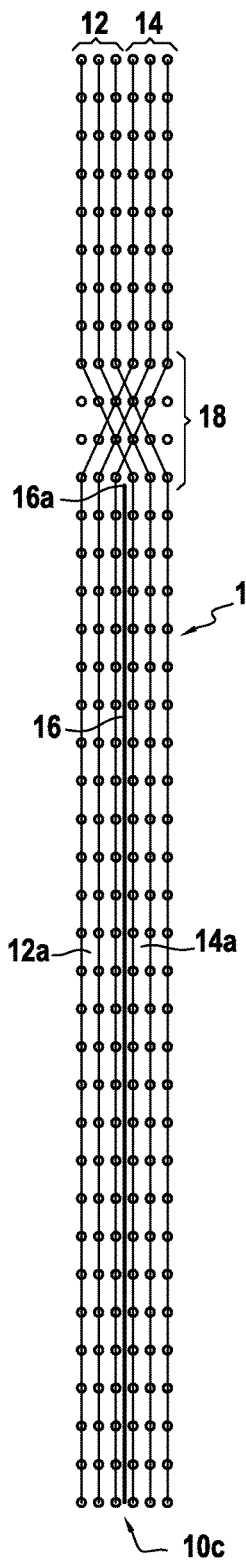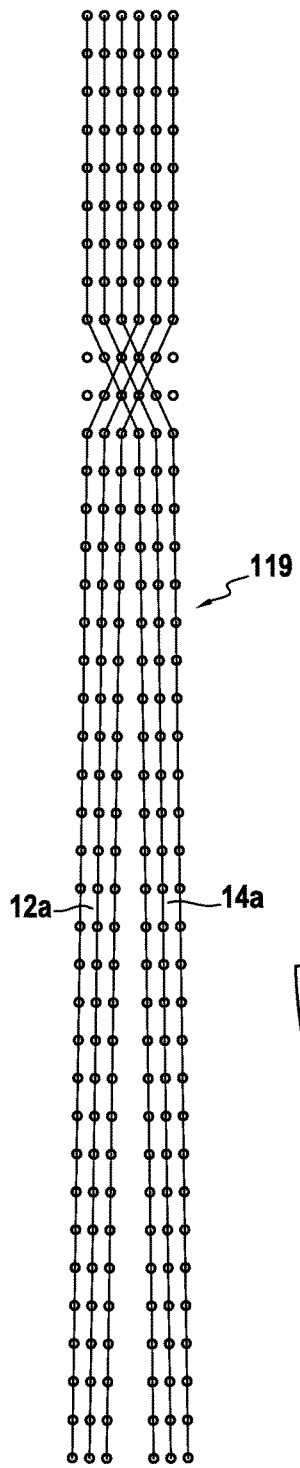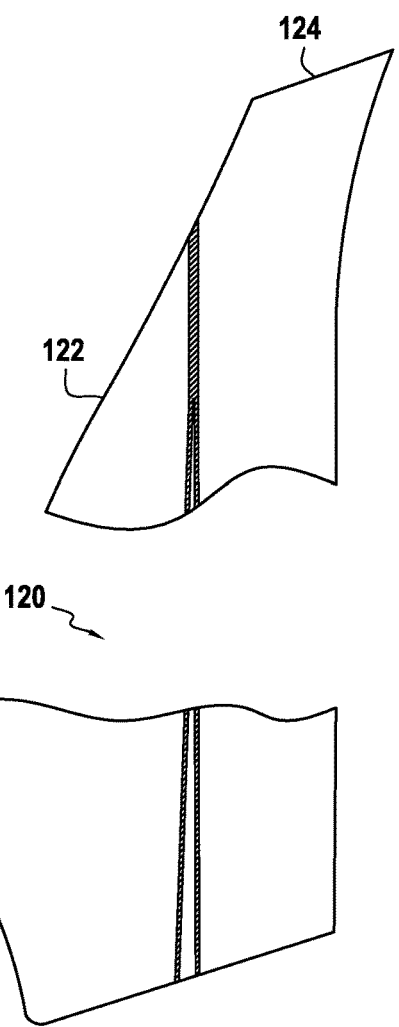
FIG.17  FIG.18  FIG.19

FIBER STRUCTURE WOVEN AS A SINGLE PIECE BY 3D WEAVING, AND AN APPLICATION THEREOF TO FABRICATING A COMPOSITE MATERIAL PART

CROSS-REFERENCE TO RELATED APPLICATIONS

This application is a division of U.S. patent application Ser. No. 14/365,369 filed Jun. 13, 2014, the entire contents of which is incorporated herein by reference. U.S. patent application Ser. No. 14/365,369 is a National Stage of PCT/FR2012/052853 filed Dec. 10, 2012, which claims the benefit of U.S. Provisional Patent Application No. 61/570,432 filed Dec. 14, 2011.

BACKGROUND OF THE INVENTION

The invention relates to making a fiber structure woven as a single piece by three-dimensional (3D) weaving, in particular for fabricating a composite material part. One particular, but non-exclusive, field of application of the invention lies in making fiber structures for preforms of composite material parts for aircraft or aeroengines, in particular for airplane turbine engines.

In well-known manner, a composite material part may be obtained by making a fiber preform and by densifying the preform with a matrix. Depending on the intended application, the preform may be made of glass, carbon, or ceramic fibers, and the matrix may be made of an organic material (a polymer), of carbon, or of ceramic.

For parts that are relatively complex in shape, it is known to make a fiber structure or blank as a single piece by 3D or multiple-layer weaving, and to shape the blank in order to obtain a fiber preform that presents a shape that is close to the shape of the part that is to be fabricated.

In order to facilitate such shaping, and in order to avoid making incisions that result in yarns being cut and that lead to a reduction in mechanical strength, it is known to leave one or more non-interlinked zones within the fiber structure while it is being woven. Such non-interlinked zones may be obtained by locally omitting any interlinking of the layers of adjacent yarns, thereby making it possible to fold out portions of the fiber structure adjacent to the non-interlinked zones.

The making of composite material parts that are complex in shape from woven structures with non-interlinked zones is described in particular in documents WO 2010/061139 and WO 2010/103213.

Nevertheless, the shaping of a fiber structure by folding out portions that are separated by a non-interlinked zone can give rise to weakness at the end of the non-interlinked zone and to excessive levels of stress on the yarns that are subjected to stress while performing such shaping.

OBJECT AND SUMMARY OF THE INVENTION

An object of the invention is to remedy such drawbacks.

In a first aspect of the invention, this object is achieved with a fiber structure woven as a single piece by three-dimensional weaving, the fiber structure having opposite surfaces and presenting:

a first portion having a plurality of layers of warp yarns and forming a first portion of the thickness of the fiber structure between its opposite surfaces;

a second portion having a plurality of layers of warp yarns and forming a second portion of thickness of the fiber structure, the warp yarns being arranged in columns each of which includes warp yarns of the first portion and of the second portion; and a set of weft yarns interlinking the layers of warp yarns of the first portion and of the second portion while leaving at least one non-interlinked zone separating the first and second portions over a portion of the dimension of the fiber structure in the weft direction from an edge of the fiber structure to an end of non-interlinked zone, in which fiber structure, in each plane:

one or more same first weft yarns interlink layers of warp yarns of the first portion of the fiber structure adjacent to the non-interlinked zone and layers of warp yarns of the second portion of the fiber structure beyond the non-interlinked zone; and one or more same second warp yarns interlink layers of weft yarns of the second portion of the fiber structure adjacent to the non-interlinked zone and layers of warp yarns of the first portion of the fiber structure beyond the non-interlinked zone;

such that the paths of the first weft yarn(s) and of the second weft yarn(s) cross over in at least one transition zone extending in the fiber structure from the end of the non-interlinked zone; and the transition zone extends in the weft direction over a distance that is greater than the pitch between adjacent warp columns.

The crossing-over of weft yarns in a transition zone adjacent to the end of the non-interlinked zone reinforces said end and can give rise to reduced stress on the yarns while folding out a fraction of the fiber structure adjacent to the non-interlinked zone.

In an embodiment, a plurality of first weft yarns, as well as a plurality of second weft yarns, follow similar paths between the ends in the weft direction of the transition zone.

In another embodiment, a plurality of first weft yarns, as well as a plurality of second weft yarns, follow similar paths that are mutually offset in the weft direction in the transition zone(s).

Advantageously, the outer layers of warp yarns adjacent to the opposite surfaces of the fiber structure are woven with the same weft yarns extending continuously over the entire dimension of the fiber structure in the weft direction, thus making it possible to preserve continuity of surface yarns.

Also advantageously, in at least one of the first and second portions of the fiber structure, the warp yarns of the outer layers of warp yarns adjacent to a surface of the fiber structure are woven with the same weft yarns having paths that cross over at a location corresponding substantially to that of the transition zone, thus making it possible, while folding out a fraction of the fiber structure adjacent to the non-interlinked zone, to limit the curvature that is imposed on the weft yarns adjacent to the surface.

In an embodiment, the fiber structure presents at least two non-interlinked zones separating the first and second portions over a portion of the dimension of the fiber structure in the weft direction from opposite edges of the fiber structure as far as respective ends of non-interlinked zones, thus making it possible, after shaping, to obtain a fiber preform having a section that is π-shaped or I-shaped.

In another aspect of the invention, the intended object is achieved with a fiber structure as defined above in which the terms "weft" and "warp" are interchanged.

In yet another aspect of the invention, the invention provides a method of fabricating a composite material part comprising making a fiber preform by shaping a fiber structure as defined above, the shaping including at least folding out a fraction of the first or the second portion of the fiber structure adjacent to a non-interlinked zone, and densifying the preform with a matrix.

According to yet another aspect of the invention, the invention provides a method of fabricating a composite material part having a substantially π-shaped section, the method comprising making a fiber preform by shaping a fiber structure as defined above with two non-interlinked zones, the shaping including folding out fractions of the first or the second portion of the fiber structure adjacent to the two non-interlinked zones, and densifying the preform with a matrix.

By way of example, such a part having a section that is substantially π-shaped may be a fan blade platform for a turbine engine.

According to another aspect of the invention, the invention provides a method of fabricating a composite material part of substantially I-shaped section, the method comprising making a fiber preform by shaping a fiber structure as defined above with two non-interlinked zones, the shaping including folding out fractions of the first and second portions of the fiber structure adjacent to the two non-interlinked zones, and densifying the preform with a matrix.

By way of example, such a part of section that is substantially I-shaped may be an outlet guide vane of a turbine engine.

According to yet other aspects, the invention provides a hollow propeller blade for an aeroengine obtained by a method as defined above.

BRIEF DESCRIPTION OF THE DRAWINGS

The invention can be better understood on reading the following description given by way of non-limiting indication and with reference to the accompanying drawings, in which:

FIG. 3 is a diagrammatic plan view of a 3D woven fiber structure in an embodiment of the invention;

FIG. 4 is a diagrammatic plan view of a π-shaped preform obtained by shaping the FIG. 3 fiber structure;

FIG. 14 is a highly diagrammatic section view of a 3D woven structure in an embodiment of the invention;

FIG. 15 is a highly diagrammatic section view of a preform of I-shaped profile obtained by shaping the FIG. 14 fiber structure;

FIG. 16 is a diagrammatic perspective view of an outlet guide vane obtained by densifying a preform of I-shaped profile;

FIG. 17 is a diagrammatic section view of a 3D woven structure in an embodiment of the invention;

FIG. 18 is a highly diagrammatic section view of a preform of V-shaped profile obtained by shaping the FIG. 17 fiber structure; and FIG. 19 is a diagrammatic view of a propeller obtained by densifying a preform of V-shaped profile.

DETAILED DESCRIPTION OF EMBODIMENTS

In order to avoid overcrowding the drawings, in FIGS. 1, 2, 3, 4, 5, 7, 8, 10 and 11, the paths of the weft yarns are drawn as straight lines while the warp yarns, shown in section, are represented by dots. Since 3D weaving is involved, it will be understood that the weft yarns follow sinuous paths so as to interlink warp yarns belonging to different layers of warp yarns, with the exceptions of non-interlinked zones, it being observed that 3D weaving, and in particular using an interlock weave, may include 2D weaving at the surface. By way of example, various 3D weaves may be used, such as interlock, multiple-satin, or multiple-plain weaves, as described in particular in document WO 2006/136755.

Figure 1:
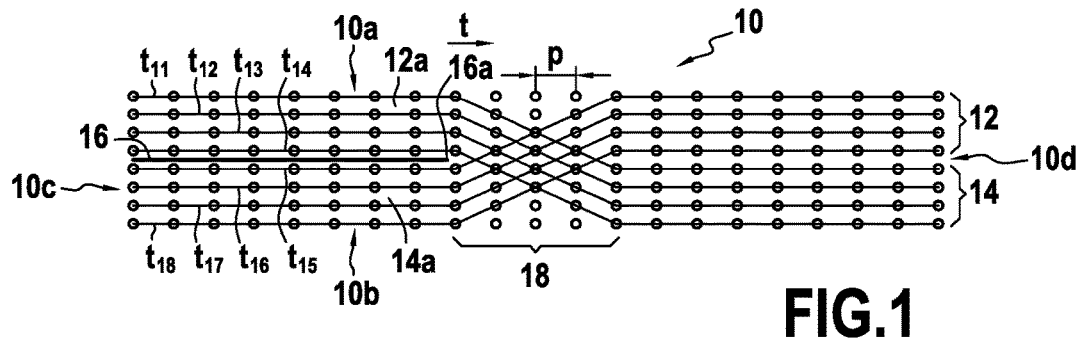
FIG. 1 is a highly diagrammatic section view of a 3D woven fiber structure in an embodiment of the invention.
Figure 2:
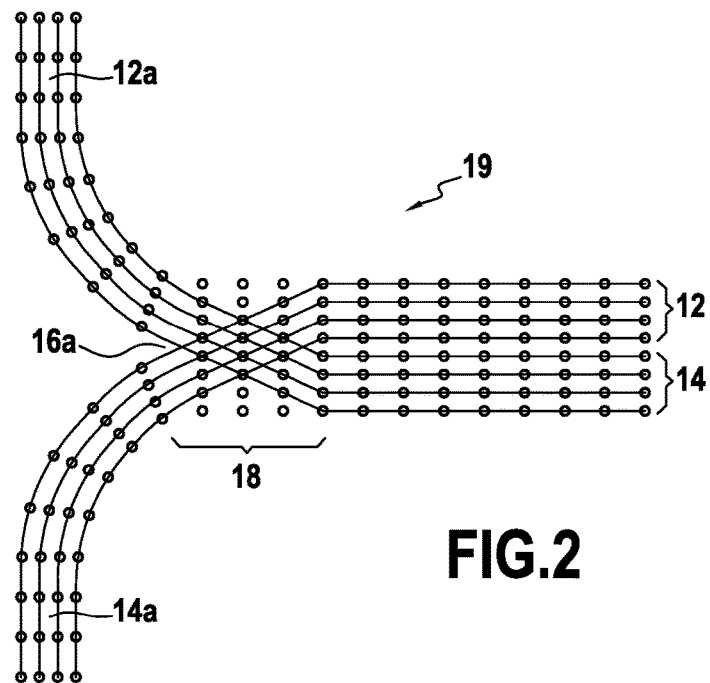
FIG. 2 is a highly diagrammatic section view of a preform obtained by shaping the FIG. 1 fiber structure.

FIG. 1 shows highly diagrammatically a weft plane in a 3D woven fiber structure 10 constituting a single piece having opposite faces 10a and 10b. The terms "weft plane" is used herein to mean a section plane perpendicular to the warp direction and showing one column of weft yarns. The fiber structure 10 comprises two portions 12 and 14 respectively forming first and second portions of the thickness of the fiber structure 10. Each portion 12, 14 comprises a plurality of superposed layers of warp yarns, four of them in the example shown, the number of layers of warp yarns potentially being any desired number not less than two, depending on the desired thickness. Furthermore, the number of layers of warp yarns in the portions 12 and 14 could be different from each other. It is also possible to have a number of layers of warp yarns that is not constant along the entire weft direction. The warp yarns are arranged in columns, each comprising both warp yarns of the portion 12 and warp yarns of the portion 14 of the fiber structure 10.

Over a portion of the dimension of the fiber structure 10 in the weft direction (t), the two portions 12 and 14 of the fiber structure are totally separated from each other by a non-interlinked zone 16 that extends from an edge 10c of the fiber structure 10 to an end 16a of the non-interlinked zone. The term non-interlinked zone is used herein to mean a zone that is not crossed by weft yarns interlinking the warp yarns in the layers belonging respectively to the portions 12 and 14 of the fiber structure 10.

Except in the non-interlinked zone, the layers of warp yarns are interlinked by weft yarns belonging to a plurality of layers of weft yarns.

In the example shown, in each plane of the fiber structure 10, first weft yarns $t_{11}$ to $t_{14}$ interlink the warp yarns of the layers of warp yarns in the fraction 12a of the portion 12 adjacent to the non-interlinked zone 16, and also warp yarns of the warp yarn layers of the portion 16 beyond the non-interlinked zone 16. Conversely, second weft yarns $t_{15}$ to $t_{18}$ interlink the warp yarns of the warp yarn layers in the fraction 14a of the portion 14 adjacent to the non-interlinked zone 16 and also warp yarns of the layers of warp yarns in the portion 12 beyond the non-interlinked zone 16. Naturally, the portions 12 and 14 of the fiber structure 10 beyond the non-interlinked zone 16 are themselves interlinked.

By way of example, it is possible to adopt a satin weave on the surface for the weft yarns $t_{14}$ and $t_{15}$ in the fractions 12a and 12b that are separated by the non-interlinked zone 16, with weaving continuing with an interlink weave beyond the non-interlinked zone 16.

Thus, the paths of the yarns $t_{11}$ to $t_{14}$ and the paths of the yarns $t_{15}$ to $t_{18}$ cross in a transition zone 18 that extends from the end 16a of the non-interlinked zone 16. In the weft direction, this transition zone 18 extends over a distance of more than one pitch p between adjacent columns of warp yarns, and preferably of not less than 2p. In the example shown, this distance is equal to 4p. In the transition zone 18, the yarns $t_{11}$ to $t_{14}$, like the yarns $t_{15}$ to $t_{18}$, follow similar parallel paths between the ends of the transition zone 18 in the weft direction.

A fiber preform 19 of substantially T-shaped profile (FIG. 2) is obtained by folding out the fractions 12a and 14a on either side of the non-interlinked zone 16. Because the weft yarns pass through the layers of warp yarns in the transition zone 18 in a progressive manner, the weft yarns are less exposed to any risk of damage in comparison with crossing more suddenly through a gap between two columns of warp yarns. Furthermore, the fact of having a transition zone that extends in the weft direction over a length that is relatively long imparts better capacity for deformation.

FIG. 3 is a plan view of a fiber structure 20 that has a base portion with an outside face 20a and an inside face 20b. In its thickness, the fiber structure includes two fractions 22 and 24 that are mutually separated over a portion of the dimension of the fiber structure in the weft direction by non-interlinked zones 26 and 26'. The non-interlinked zones 26 and 26' extend from opposite edges 20c and 20d of the fiber structure 20 to respective ends 26a and 26'a of the non-interlinked zones, with the central fraction of the fiber structure 20 not including any non-interlinked zone.

Each portion 22 and 24 of the fiber structure has a plurality of layers of warp yarns, the numbers of layers of warp yarns in the portions 22 and 24 being different in this example.

In each plane of the fiber structure 20, the same first weft yarns $t_{21}$, $t_{22}$, $t_{23}$, $t_{24}$ interlink the warp yarns in the portion 24 beyond the non-interlinked zone 26' and also interlink the warp yarns in the fraction 22a of the portion 22 beside the non-interlinked zone. Conversely, the same second weft yarns $t_{25}$, $t_{26}$, $t_{27}$, $t_{28}$ interlink the warp yarns in the fraction 22'a of the portion 22 beside the non-interlinked zone 26' and also interlink the warp yarns in the portion 24 before the non-interlinked zone.

Thus, the paths of the yarns $t_{21}$, $t_{22}$, $t_{23}$, $t_{24}$ cross the paths of the yarns $t_{25}$, $t_{26}$, $t_{27}$, $t_{28}$ in a transition zone 28 situated in the central portion of the fiber structure 20 between the ends 26a and 26'a of the non-interlinked zones 26 and 26'. As in the embodiment of FIG. 1, the paths of the weft yarns $t_{21}$, $t_{22}$, $t_{23}$, $t_{24}$ and also the paths of the weft yarns $t_{25}$, $t_{26}$, $t_{27}$, $t_{28}$ between the ends of the transition zone 28 are similar, with the transition zone 28 extending over a distance in the weft direction that is greater than p, here equal to 4p.

It should be observed that from one weft plane to another, the location of the transition zone may be offset in the weft direction in order to avoid having any portion with a greater number of yarn crossovers than some other portion between the non-interlinked zones 26 and 26'.

The shaping of the fiber structure 20 in order to obtain a fiber preform 29 of substantially π-shaped structure comprises folding out the fractions of the portion 24 of the fiber structure beside the non-interlinked zones 26 and 26', as shown in FIG. 4, so as to form in section the legs 24a and 24'a of the π-shape, which legs extend from the inside face 20b. In the portion of the fiber structure 20 and of the fiber preform 29 adjacent of the outside face 20a, it should be observed that weaving is performed with a satin weave (yarn $t_{29}$) at the surface so as to provide surface continuity without passing through the layers of warp yarns and without crossing any other weft yarn.

In the example shown, it should also be observed that the fractions of the portion 24 of the fiber structure 20 that are to form the legs 24a and 24'a extend beyond the edges of the portion 22 by adding columns of warp yarns, so as to impart a desired length to the legs 24a and 24'a.

Figure 5:
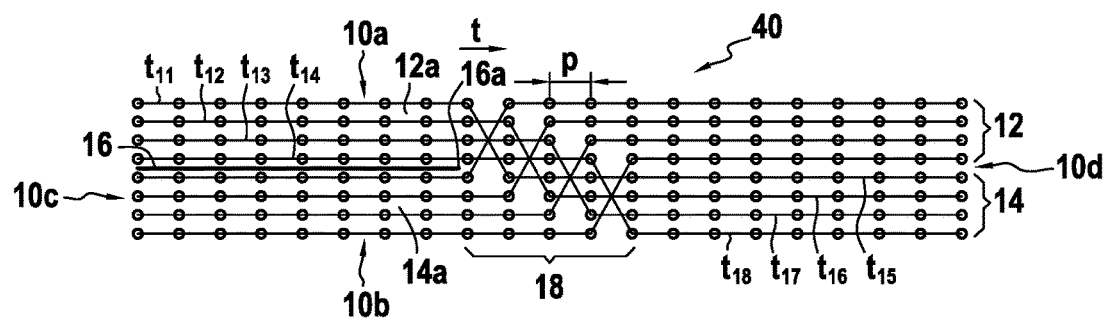
FIG. 5 is a highly diagrammatic section view of a 3D woven fiber structure in an embodiment of the invention.

FIG. 5 shows, highly diagrammatically, a single-piece 3D woven fiber structure 40 in a second embodiment of the invention. Elements that are common between the fiber structure 40 of FIG. 4 and the fiber structure 10 of FIG. 1 are given the same references and they are not described again.

The fiber structure 40 differs from the fiber structure 10 in the paths followed through the layers of warp yarns by the weft yarns that cross in the transition zone 18.

Thus, each weft yarn $t_{11}$, $t_{12}$, $t_{13}$, $t_{14}$ passes therethrough over a distance in the weft direction that is equal to the pitch p between the columns of warp yarns, however the paths of the weft yarns $t_{11}$ to $t_{14}$ are mutually offset in the weft direction, with the offset in the example shown being equal to the pitch p. The same applies to the weft yarns $t_{15}$, $t_{16}$, $t_{17}$, and $t_{18}$. There is thus a transition zone 18 that, as in the above-described embodiment, extends in the weft direction over a distance that is greater than the pitch p, specifically over a distance of 4p. Compared with the embodiment of FIG. 1, greater stress is exerted on the weft yarns as they pass through the transition zone, but the dimension thereof imparts good capacity for deformation.

Figure 6:
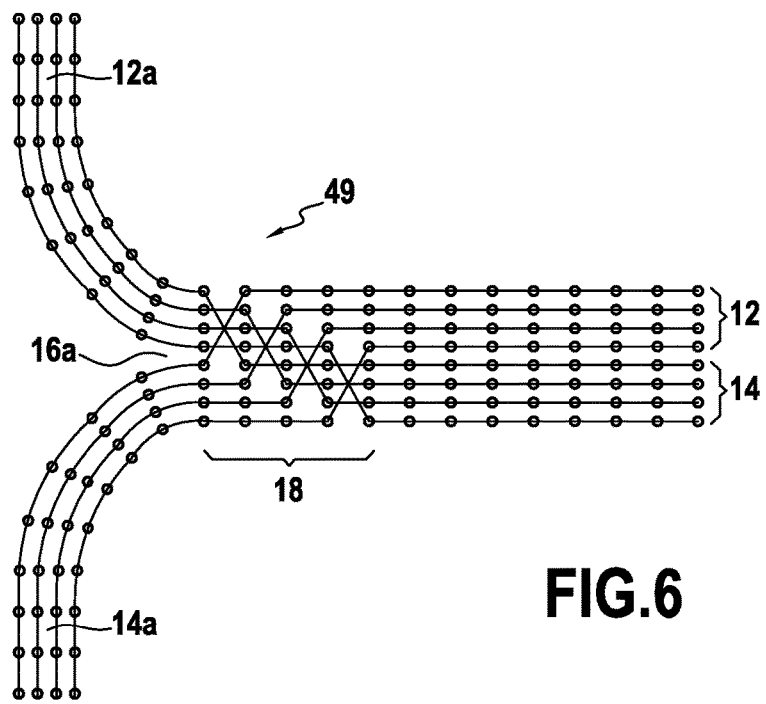
FIG. 6 is a highly diagrammatic section view of a preform obtained by shaping the FIG. 5 fiber structure.

FIG. 6 shows a fiber preform 49 of substantially T-shaped section obtained after folding out the fractions 12a and 14a on either side of the non-interlinked zone 16 of the portions 12 and 14 of the fiber structure 40.

Figure 7:
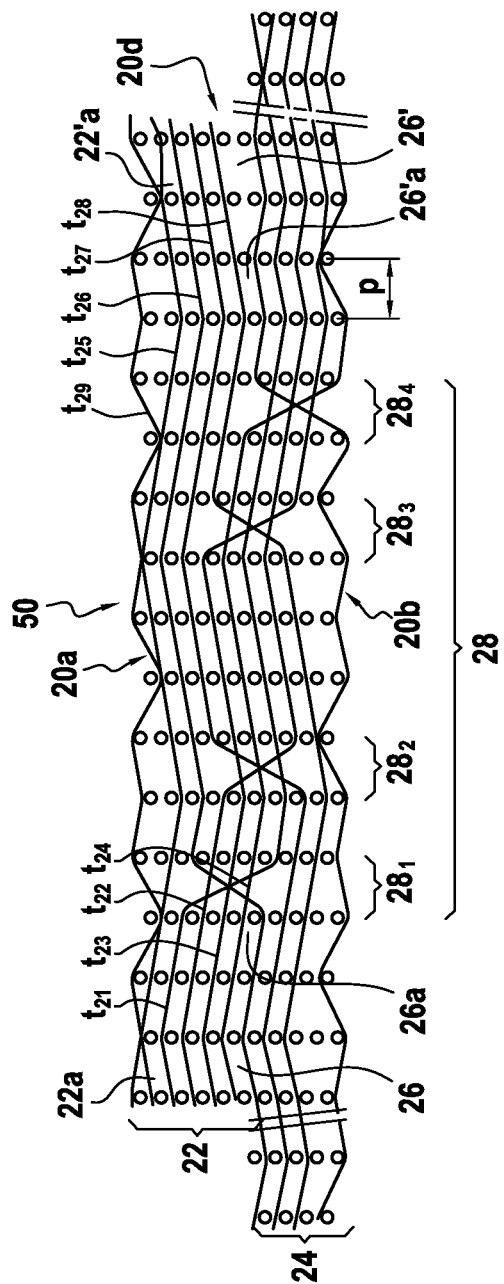
FIG. 7 is a diagrammatic plan view of a π-section preform in an embodiment of the invention.

FIG. 7 is a plan view of a fiber structure 50 suitable for obtaining a preform of substantially π-shaped section. Elements common between the fiber structure 50 of FIG. 7 and the fiber structure 20 of FIG. 3 are given the same references and they are not described again.

The fiber structure 50 differs from the fiber structure 20 by the paths followed through the layers of warp yarns by the weft yarns.

Thus, each of the weft yarns $t_{21}$, $t_{22}$, $t_{23}$, $t_{24}$ passes through the layers over a distance in the weft direction that is equal to the pitch p between the columns of warp yarns, with the same applying to the paths followed by each of the weft yarns $t_{25}$, $t_{26}$, $t_{27}$, $t_{28}$. Nevertheless, the locations where the yarns $t_{21}$ to $t_{24}$ and likewise the locations where the yarns $t_{25}$ to $t_{28}$ cross one another on passing through are offset relative to one another in the weft direction. In the example of FIG. 7, the transition zone 28 extends over a relatively long distance between the ends 26a and 26'a of the non-interlinked zones 26 and 26', being formed over a plurality of individual transition zones $28_1$, $28_2$, $28_3$, and $28_4$, with the crossovers thus being distributed in the weft direction over the fraction of the fiber structure that extends between the non-interlinked zones 26 and 26'.

A fiber preform of section that is substantially π-shaped is obtained by folding out the fractions of the portion 24 of the fiber structure that are adjacent to the non-interlinked zones 26 and 26', as in FIG. 4.

Figure 8:
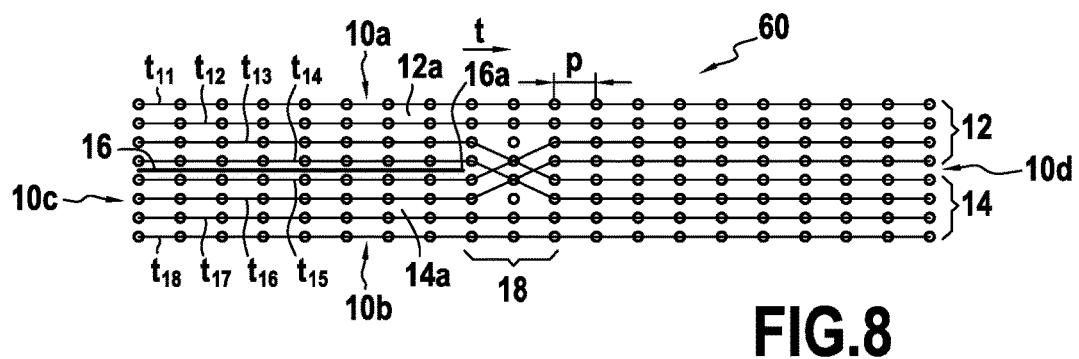
FIG. 8 is a highly diagrammatic section view of a 3D woven fiber structure in an embodiment of the invention.

FIG. 8 is a highly diagrammatic view of a single-piece 3D woven fiber structure 60 in a third embodiment of the invention. Elements that are common to the fiber structure 60 of FIG. 8 and the structures 10 and 40 of FIGS. 1 and 5 are given the same references and they are not described again.

The fiber structure 60 differs from the fiber structure 10 in that, in each plane, only some of the weft yarns are concerned by the process of passing through and crossing over, these weft yarns being those that interlink the warp yarns of the layers of warp yarns in the fractions of the fiber structure 60 adjacent to the non-interlinked zone 16, while the warp yarns situated in the fractions of the fiber structure adjacent to its faces 10a and 10b extend continuously along these surfaces without passing through warp layers or crossing other weft yarns. In this way, it is possible to reinforce the fiber structure at the end of the non-interlinked zone, while preserving surface continuity that encourages a good surface state for a composite material part as finally obtained.

In the example shown, the weft yarns $t_{11}$, $t_{12}$, $t_{17}$, and $t_{18}$ extend continuously between the edges 10c and 10d of the fiber structure 60 without crossing other weft yarns. In contrast, the weft yarns $t_{13}$ and $t_{14}$ in the fraction 12a of the portion 12 of the fiber structure 60 adjacent to the non-interlinked zone 16 pass through layers of warp yarns immediately beyond the end 16a of the non-interlinked zone 16 so as to enter into the portion 14 of the fiber structure 60. Conversely, the weft yarns $t_{15}$ and $t_{16}$ in the fraction 14a of the portion 14 of the fiber structure 60 adjacent to the non-interlinked zone 16 pass through layers of warp yarns immediately beyond the end 16a of the non-interlinked zone 16, crossing the weft yarns $t_{13}$ and $t_{14}$ in order to enter into the portion 12 of the fiber structure 10. The paths through the warp yarns and the crossovers with the weft yarns take place in a transition zone 18 that presents a dimension in the weft direction that is greater than the pitch p between columns of warp yarns, this dimension being equal to 2p in the present example. The configuration with weft yarns extending continuously close to the faces 10a and 10b, and weft yarns involved in the process of passing through and crossing over inside the fiber structure 60 is to be found in each plane of the fiber structure.

Naturally, the number of weft yarns situated in the fractions 12a and 14a adjacent to the non-interlinked zone and concerned by the process of passing through and crossing over may be other than two, and it must be not less than one. Similarly, the number of weft yarns adjacent to the faces 10a and 10b and extending continuously without crossovers between the edges 10c and 10b may be other than two, being at least equal to one.

Figure 9:
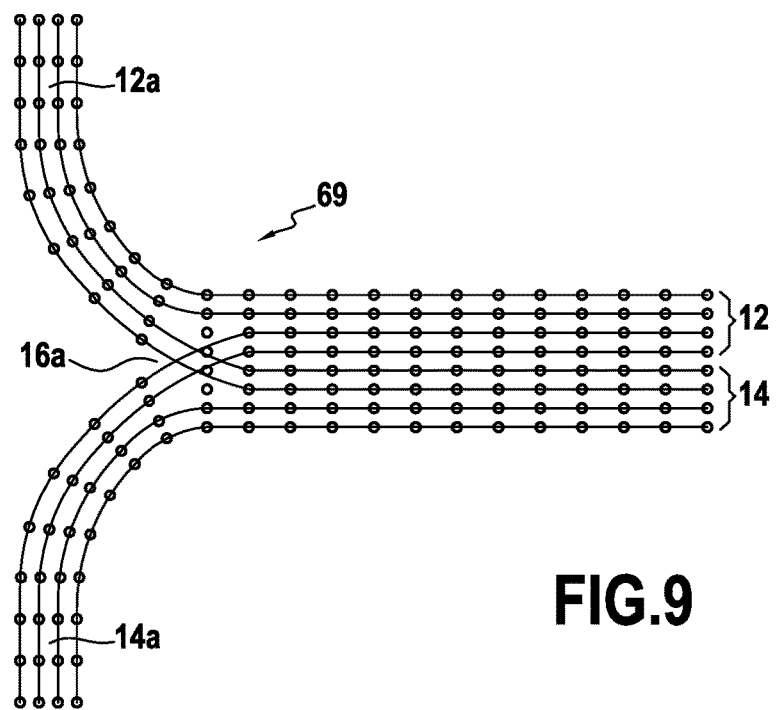
FIG. 9 is a highly diagrammatic section view of a preform obtained by shaping the FIG. 8 fiber structure.

FIG. 9 shows a fiber preform 69 of substantially T-shaped section obtained after folding out the fractions 12a and 14a on either side of the non-interlinked zone 16 of the portions 12 and 14 of the fiber structure 60. The weft yarns $t_{11}$, $t_{12}$, $t_{17}$, $t_{18}$ that are not concerned by the process of passing through and crossing over follow a smooth path through the curved zones.

Figure 10:
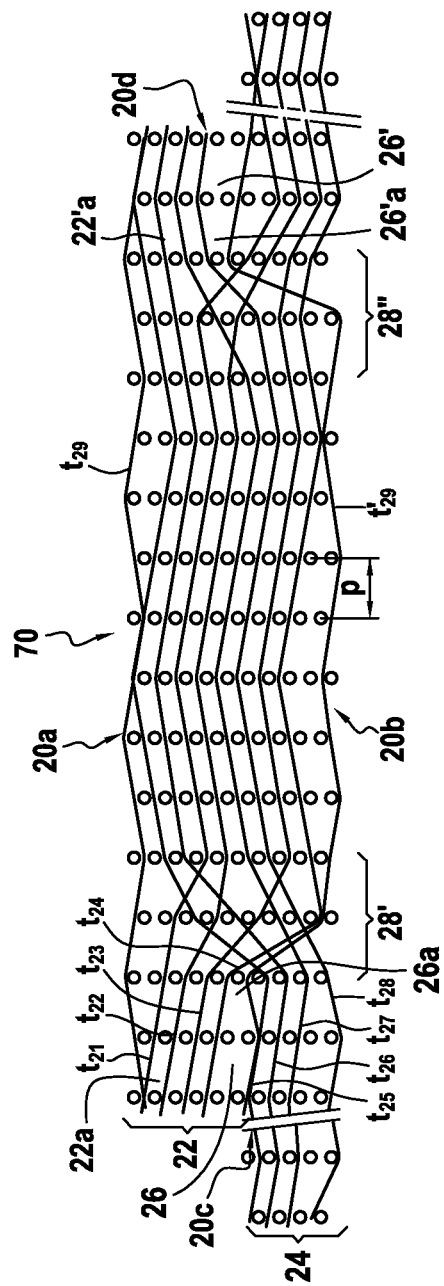
FIG. 10 is a diagrammatic plan view of a π-section preform in an embodiment of the invention.

FIG. 10 shows a plan of a fiber structure 70 suitable for obtaining a fiber preform of substantially π-shaped section. Elements common between the fiber structure 70 of FIG. 11 and the fiber structures 20 and 50 of FIGS. 3 and 7 are given the same references and they are not described again, The fiber structure 70 differs from the fiber structures 20 and 50 in particular by the presence of a weft yarn $t'_{29}$ that extends continuously along the inside face 20b and along the faces of the fractions of the portion 24 beside the non-interlinked zones 26 and 26', thereby providing continuity for the surface of the preform on the inside.

In addition, the crossovers between the weft yarns take place in two transition zones 28' and 28" that are situated in the immediate proximity of the ends 26a and 26'a of the non-interlinked zones 26 and 26'. Each transition zone extends in the weft direction over a distance that is greater than the pitch p between columns of the warp yarns, specifically over a distance equal to 2p.

Figure 11:
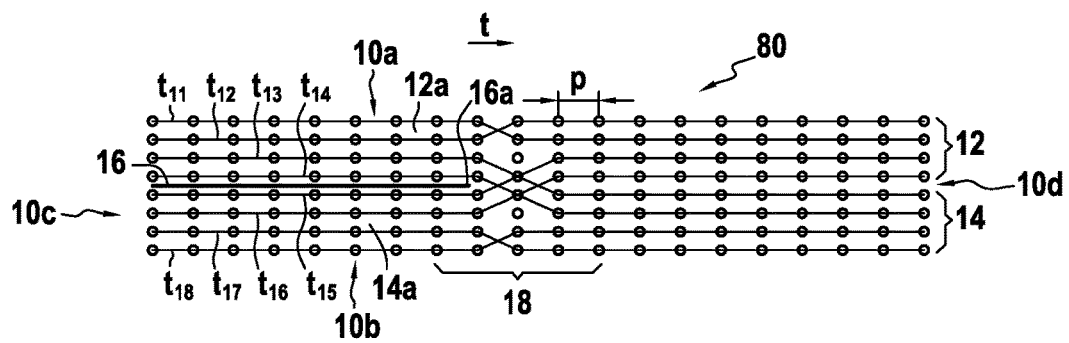
FIG. 11 is a highly diagrammatic section view of a 3D woven fiber structure in an embodiment of the invention.

FIG. 11 is a diagram of a single-piece 3D woven fiber structure 80 in a fourth embodiment of the invention. Elements that are common between the fiber structure 80 of FIG. 11 and the structures 10, 40, and 60 of FIGS. 1, 5, and 8 are given the same references and they are not described again.

Figure 12:
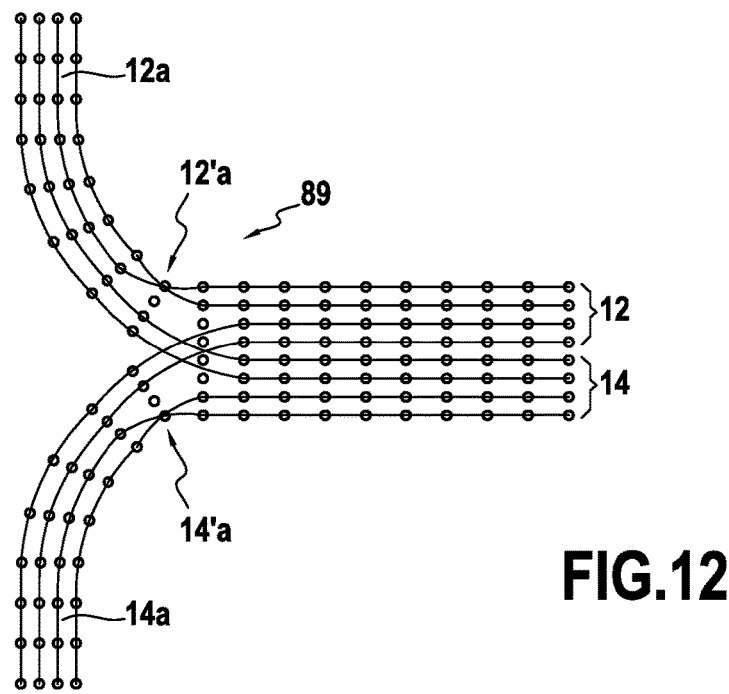
FIG. 12 is a highly diagrammatic section view of a preform obtained by shaping the FIG. 11 fiber structure.

The fiber structure 80 differs from the fiber structure 60 in that, in each plane, the weft yarns that weave the warp yarns of the layers of warp yarns closest to the faces 10a and 10b, specifically the weft yarns $t_{11}$ and $t_{12}$ and also the weft yarns $t_{17}$ and $t_{18}$, cross over on their paths between the opposite edges 10c and 10d without crossing any other weft yarns. These crossovers are situated substantially at the end of the non-interlinked zone 16, i.e, at the connections 12'a and 14'a between the fractions 12a and 14a and the remainder of the fiber structure 80, when it is shaped, as shown in FIG. 12.

The effect of this crossover configuration in the connection zones 12'a and 14'a is for the yarns $t_{11}$, $t_{12}$, $t_{17}$, and $t_{18}$ to present smaller amounts of curvature, i.e. to follow greater radii of curvature, in comparison with the embodiment of FIGS. 8 and 9. The yarns $t_{11}$, $t_{12}$, $t_{17}$, and $t_{18}$ are thus less stressed during shaping, in particular when the angle at which the fraction 12a or 14a is folded out is relatively large.

In the various embodiments described, the fiber structure is formed by 3D weaving with yarns of a nature that is selected as a function of the intended application, e.g. yarns made of glass, of carbon, or of ceramic.

After the fiber structure has been shaped, the fiber preform is densified by forming a matrix that is likewise of a nature that is selected as a function of the intended application, e.g. an organic matrix obtained in particular from a resin that is a precursor of a polymer matrix, such as an epoxy, bismaleimide, or polyimide resin, or a carbon matrix, or a ceramic matrix. For a carbon matrix or a ceramic matrix, densification may be performed by chemical vapor infiltration (CVI) or by impregnating with a liquid composition that contains a carbon or ceramic precursor resin and by applying heat treatment to pyrolize or to ceramize the precursor, which methods are themselves well known.

Figure 13:
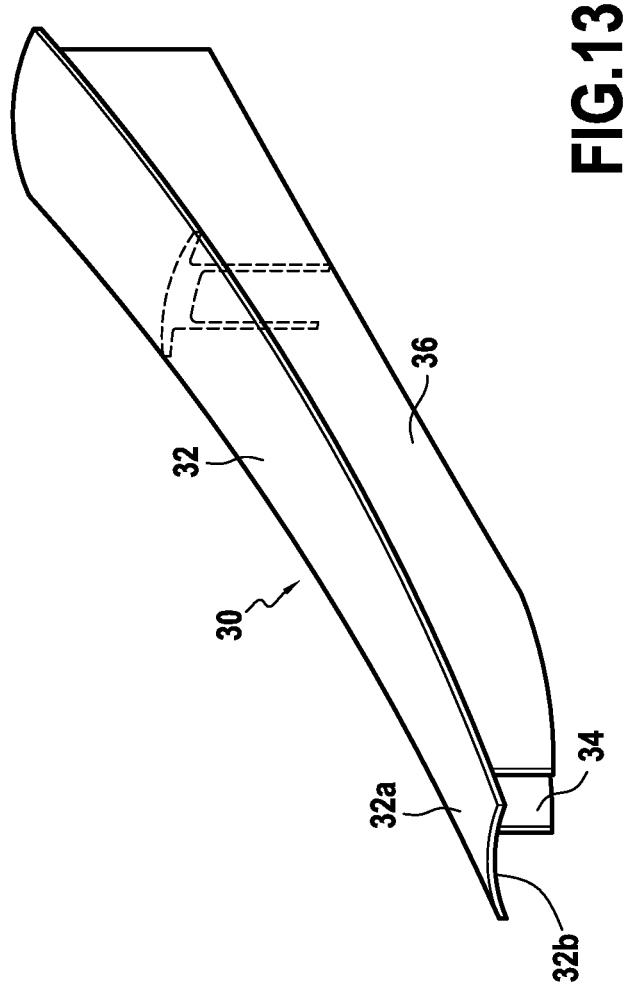
FIG. 13 is a diagrammatic perspective view of a fan blade platform obtained by densifying a preform of substantially π-shaped section.

FIG. 13 is a highly diagrammatic view of a fan platform 30 for an aviation turbine engine, the platform being made of composite material of the kind that can be obtained by densifying a fiber preform having a substantially π-shaped section, as shown in FIG. 4 or as obtained from the fiber structures of FIGS. 7 and 10. The fibers are preferably carbon fibers and the matrix is preferably a polymer matrix.

The platform 30 comprises a base 32 having a top face 32a and a bottom face 32b, and two legs 34 and 36 that serve in particular to form stiffening webs and that extend from the bottom face 32b of the platform 30, which thus has a π-shaped section, as shown in dashed lines.

The platform 30 is designed to be mounted in the gap between two fan blades, in the vicinity of their roots, so as to define the inside of an annular air inlet passage through the fan, which passage is defined on the outside by a fan casing. The platform 30 is machined to its final dimensions after the fiber preform has been densified.

Fiber preforms obtained from fiber structures presenting one or more non-interlinked zones and in accordance with the invention may be used for fabricating other composite material parts of aeroengines.

Thus, FIG. 14 is a highly diagrammatic view of a weft plane of a 3D woven fiber structure 90 that differs from the fiber structure 10 of FIG. 1 in particular in that the portions 14 and 16 are separated from each other along two non-interlinked zones 16 and 16' that extend from opposite edges 10*c* and 10*d* of the fiber structure 90 to respective non-interlinked zone ends 16 and 16'*a*.

The paths of the weft yarns cross over in transition zones 18 and 18' that extend from the ends 16*a* and 16'*a* of the non-interlinked zones 16 and 16'. The transition zones 18 and 18' may be similar to the transition zone 18 of the fiber structure 10 of FIG. 1. In a variant, it is possible to adopt transition zones that are analogous to the transition zones of the fiber structures 40 and 60 of FIGS. 5 and 8.

A fiber preform 99 of substantially I-shaped section (or H-shaped section) is obtained (FIG. 15) by folding out the fractions 12*a* and 14*a* of the portions 12 and 14 beside the non-interlinked zone 16 and the fractions 12'*a* and 14'*a* of the portions 12 and 14 beside the non-interlinked zone 16'.

FIG. 16 is a highly diagrammatic view of a composite material outlet guide vane (OGV) 100 of an aviation turbine engine as can be obtained by densifying a fiber preform of section that is substantially I-shaped or that is substantially H-shaped. The fibers are preferably carbon fibers and the matrix is preferably a polymer matrix.

The outlet guide vane 100 comprises an airfoil 102 secured at its ends to an outer preform 104 and to an inner platform 106, the vane 100 being for mounting in a secondary flow passage of a bypass aviation turbine engine, downstream from the fan. The outlet guide van 100 presents a section that is substantially I- (or H-) shaped, as shown in dashed lines in FIG. 16.

In order to fabricate such an outlet guide vane 100, it is possible to use a fiber preform similar to that shown in FIG. 15 with cuts formed so as to reproduce the dimensions of the airfoil and of the platforms when developed flat.

FIG. 17 is a highly diagrammatic view of a weft plane of a 3D smoothened fiber structure 110 that differs from the fiber structure 10 of FIG. 1 by the fact that the portions 12 and 14 are separated from each other by a non-interlinked zone 16 that extends over the major portion of the dimension of the fiber structure 110 in the weft direction, starting from an edge 10*c* and extending to a non-interlinked zone end 16*a*.

The paths of the weft yarns cross over in a transition zone 18 that extends from the end 16*a* of the non-interlinked zone 16. The transition zone 18 of the fiber structure 110 may be similar to the transition zone of the fiber structure 10 of FIG. 1. In a variant, it is possible to adopt a transition zone similar to that of the fiber structure 40 of FIG. 5 or of the fiber structure 60 of FIG. 8.

A fiber preform 119 of substantially V-shaped section is obtained (FIG. 18) by spreading apart the fractions 12*a* and 14*a* of the portions 12 and 14 that are adjacent to the non-interlinked zone 16.

FIG. 19 is a highly diagrammatic view of a hollow propeller blade 120 of an aeroengine of the kind that can be obtained by densifying a fiber preform of section that is substantially V-shaped. The fibers are preferably carbon fibers and the matrix is preferably a polymer matrix.

The propeller blade 120 presents a solid portion along its leading edge 122 and at its tip 124, this solid portion being extended by a hollow portion giving a profile of substantially V-shaped section, as shown by FIG. 19.

The propeller blade 120 may be obtained by densifying a preform derived from a fiber structure with non-interlinking similar to that of FIG. 17. During weaving of the fiber structure, the locations of the transition zones in successive planes are selected so as to comply with the profile of the propeller blade.

In the various above-described embodiments, weft yarns situated on one side of a non-interlinked zone and weft yarns situated on the other side of the non-interlinked zone cross over in a portion of the fiber structure beyond the end of the non-interlinked zone by passing through layers of warp yarns, with the crossovers being spread in the weft direction over a transition zone that extends over a distance that is greater than the pitch between the columns of warp yarns, typically over a distance of several pitches, the transition zone covering all of these crossovers possibly itself being made up of a plurality of individual transition zones. The weft yarns that cross over in the transition zone preferably belong to the fractions of the fiber structure that are adjacent to a non-interlinked zone, the weft yarns situated in a fraction of the fiber structure adjacent to an outside surface possibly not being involved by the process of passing through the layers of warp yarns and crossing other weft yarns.

Finally, it should be observed that in the embodiments described, the terms "weft" and "warp" could be interchanged.

The invention claimed is:

1. A fiber structure woven as a single piece by three-dimensional weaving, the fiber structure having first and second opposite surfaces and comprising:
    a first portion having a plurality of layers of weft yarns and forming a first portion of a thickness of the fiber structure between the first and second opposite surfaces;
    a second portion including a plurality of layers of weft yarns and forming a second portion of the thickness of the fiber structure, the weft yarns being arranged in columns each of which includes weft yarns of the first portion and of the second portion; and
    in each plane of the fiber structure, a set of warp yarns interlinking the layers of weft yarns of the first portion and the layers of weft yarns of the second portion while leaving at least one non-interlinked zone separating the first and second portions over a portion of the dimension of the fiber structure in the warp direction from a first edge of the fiber structure to an end of non-interlinked zone, wherein:
    at least two first warp yarns interlink layers of weft yarns of the first portion of the fiber structure adjacent to the non-interlinked zone and layers of weft yarns of the second portion of the fiber structure beyond the non-interlinked zone;
    at least two second warp yarns interlink layers of weft yarns of the second portion of the fiber structure adjacent to the non-interlinked zone and layers of weft yarns of the first portion of the fiber structure beyond the non-interlinked zone;
    paths of the first warp yarns and paths of the second warp yarns cross over in a transition zone in a single pass extending in the fiber structure in the warp direction from the end of the non-interlinked zone;

the transition zone extends in the warp direction over a distance that is greater than a pitch between adjacent weft columns;

at least one weft yarn in the transition zone is free of interlinking with the first warp yarns and is free of interlinking with the second warp yarns; and the first warp yarns interlink the layers of weft yarns of the second portion immediately after crossing through the transition zone in the warp direction, each warp yarn of the first warp yarns interlinking with a respective single layer of the weft yarns of the second portion between a section of the second portion adjacent to an end of the transition zone through which the first warp yarns cross and a second edge of the fiber structure in the warp direction such that the first warp yarns only extending in the warp direction between the first and second opposite side, and the second warp yarns interlink the layers of weft yarns of the first portion immediately after crossing through the transition zone in the warp direction, each warp yarn of the second warp yarns interlinking with a respective single layer of the weft yarns of the first portion between a section of the first portion adjacent to an end of the transition zone through which the second warp yarns cross and the second edge of the fiber structure in the warp direction such that the second warp yarns only extend in the warp direction between the first and second opposite surfaces.

2. The fiber structure according to claim 1, wherein a plurality of first warp yarns and a plurality of second warp yarns follow similar paths between ends in the warp direction of the transition zone.

3. The fiber structure according to claim 1, wherein a plurality of first warp yarns and a plurality of second warp yarns follow similar paths that are mutually offset in the warp direction in the transition zone.

4. The fiber structure according to claim 1, wherein outer layers of weft yarns adjacent to the first and second opposite surfaces of the fiber structure are woven with the same warp yarns extending continuously over an entire dimension of the fiber structure in the warp direction.

5. The fiber structure according to claim 1, wherein, in at least one of the first and second portions of the fiber structure, the weft yarns of the outer layers of weft yarns adjacent to a surface of the fiber structure are woven with the same warp yarns having paths that cross over at a location corresponding substantially to that of the transition zone.

6. The fiber structure according to claim 1, comprising at least two non-interlinked zones separating the first and second portions over a portion of the dimension of the fiber structure in the warp direction from opposite edges of the fiber structure as far as respective ends of non-interlinked zones.

7. The fiber structure according to claim 1, wherein the thickness of the fiber structure is constant.

8. The fiber structure according to claim 1, wherein the first and second opposite surfaces of the fiber structure each has a satin weave beyond the transition zone in the warp direction.

* * * * *